US012449430B2

(12) United States Patent
Hiwale et al.

(10) Patent No.: US 12,449,430 B2
(45) Date of Patent: Oct. 21, 2025

(54) AUTOMATED POSITIONING AND IMAGING OF SAMPLES

(71) Applicant: Rohit Hiwale, Bengaluru (IN)

(72) Inventors: Rohit Hiwale, Bengaluru (IN); Anchit Navelkar, Bengaluru (IN)

(73) Assignee: MORPHLE LABS INC., Lewes, DE (US)

( * ) Notice: Subject to any disclaimer, the term of this patent is extended or adjusted under 35 U.S.C. 154(b) by 924 days.

(21) Appl. No.: 17/607,964

(22) PCT Filed: Jun. 3, 2020

(86) PCT No.: PCT/IB2020/055225
§ 371 (c)(1),
(2) Date: Nov. 1, 2021

(87) PCT Pub. No.: WO2020/222218
PCT Pub. Date: Nov. 5, 2020

(65) Prior Publication Data
US 2022/0299536 A1 Sep. 22, 2022

(30) Foreign Application Priority Data
May 1, 2019 (IN) .............................. 201941017443

(51) Int. Cl.
*B01L 9/00* (2006.01)
*G01N 35/00* (2006.01)
(52) U.S. Cl.
CPC .......... *G01N 35/00029* (2013.01); *B01L 9/52* (2013.01); *G01N 2035/00039* (2013.01)

(58) Field of Classification Search
CPC .... G01N 35/00029; G01N 2035/00039; B01L 9/52; G02B 21/26; G02B 21/34
USPC .......................................................... 436/46
See application file for complete search history.

(56) References Cited

U.S. PATENT DOCUMENTS

| 6,545,264 B1 | 4/2003 | Stern |
| 2008/0198450 A1 | 8/2008 | Guo et al. |

OTHER PUBLICATIONS

"Imaging & Measuring Instruments," VR4 Product Catalogue by HOLMARC, Publication Date May 21, 2018, https://www.holmarc.com/imaging_measuring_instruments.php, 22 pages.
International Search Report for PCT/IB2020/055225, mailed Oct. 6, 2020, 3 pages.
Written Opinion for PCT/IB2020/055225, mailed Oct. 6, 2020, 7 pages.

*Primary Examiner* — Christine T Mui
(74) *Attorney, Agent, or Firm* — Cozen O'Connor (57) ABSTRACT

Systems and methods for the positioning and imaging of sample slides are provided, such as in a microscope. A positioning system comprises a cassette. The sample is provided on the cassette. The cassette may be placed in and movable within a cut-out portion of a pusher component. The pusher component is disposed above a stage. When the cassette is placed in the cut-out portion of the pusher component, a bottom surface of the cassette interfaces with a top surface of the stage. An actuator coupled to the pusher component can cause movement of the pusher component and the cassette for imaging different portions of the sample. A processing unit can send one or more signals to control actuation provided to the actuator to move the pusher component.

15 Claims, 10 Drawing Sheets

SENDING, VIA A PROCESSING UNIT, ONE OR MORE SIGNALS TO ACTIVATE AN ACTUATOR COUPLED TO A PUSHER COMPONENT, WHEREIN THE PUSHER COMPONENT IS CONFIGURED FOR OPERATION ABOVE A STAGE
902

CAUSING, BY THE ACTIVATED ACTUATOR, THE PUSHER COMPONENT TO HORIZONTALLY MOVE A CASSETTE SITUATED WITHIN A CUT-OUT PORTION OF THE PUSHER COMPONENT AND MOVABLE WITHIN THE CUT-OUT PORTION, WHEREIN THE SAMPLE SLIDE IS PROVIDED ON A TOP SURFACE OF THE CASSETTE, AND WHEREIN A BOTTOM SURFACE OF THE CASSETTE INTERFACES WITH A TOP SURFACE OF THE STAGE
904

Fig. 9

AUTOMATED POSITIONING AND IMAGING OF SAMPLES

TECHNICAL FIELD

The present subject matter relates in general to optical imaging, and in particular, to systems and methods for the automated positioning and imaging of microscope samples.

BACKGROUND

Within the field of optical imaging, there is a high demand for microscope equipment to be highly accurate. In any scientific context, accuracy of results is important. In some specific contexts, such as electron microscopy in which observations are made at the atomic level, highly accurate equipment is crucial. While accuracy is generally simple to achieve when the task involves a single, stationary slide without movement or switching to a different section of the slide, accuracy is much more difficult to achieve when a slide must be moved, e.g., in order for a different section of the slide to be imaged.

For example, sample slides with biological samples can be imaged in parts and stitched together to form a panoramic image which may be stored or transferred for remote viewing. In such cases, scanning and imaging can be performed using a scanner system that consists of an optical subassembly (e.g., an optical column) that captures images using an attached camera. To capture and stitch images of different parts, the sample slide may be moved in three-dimensions, i.e., in a horizontal direction defined by the x-axis and y-axis and a vertical direction defined by the z-axis. For moving the sample slide in the horizontal direction, usually, scanners use a flat x-y actuator that holds the sample slide and moves it in the horizontal direction.

For accurate, fast, and blur-free scanning, it is essential that the plane of focus of the sample does not change due to motion in the XY plane after focusing. Most existing solutions perform scanning by rigid clamping of the slide using some modality (e.g., a cassette, arm, or spring mechanisms) to the end effector of the actuator which moves the sample around in the XY coordinate system. It is very difficult to perform all horizontal motion such that the plane of imaging (i.e., the plane reached by the optics after focusing) coincides with the plane in which the end effector of the actuator can move. This difficulty increases when the system consists of multiple axes. Slight deviations or tilts in the axes, or bumps or inaccuracies in the bearings of the axis can cause the plane of the end effector and the plane of focus to deviate, which leads to blurring and aberrations during the scanning of slides.

Accuracy within microscopy for such situations can be partly achieved by having highly accurate and stable components which are capable of very precise motions and minimal tilting, shaking, or perturbance. One way to achieve highly accurate results is by using a microphone with highly accurate actuator components. Such accurate actuators may consist of twenty or more components and can often be quite expensive. Some designs attempt to solve the accuracy problem with configurations of the sample slide with respect to a cassette which holds the slide and/or stage upon which the cassette rests. However, when the slide holder or grasper grasps the slide containing the sample to move it, there are often slight shakes, bumps, or other perturbances which cause the sample slide to tilt, leading to the imaging being inaccurate, distorted, out of focus, or similar.

Thus, there is a need in the art to design a microscope which is capable of imaging based on positioning different sections of a slide to be captured, wherein the microscope is not prohibitively expensive, and wherein the results are highly accurate, repeatable, and result in decreased scanning time.

BRIEF DESCRIPTION OF DRAWINGS

The detailed description is described with reference to the accompanying figures. In the figures, the leftmost digit(s) of a reference number identifies the figure in which the reference number first appears. The same numbers are used throughout the drawings to reference like features and components.

DETAILED DESCRIPTION

The present subject matter disclosed herein relates to systems and methods for the automated positioning and imaging of microscope samples.

In some embodiments, sample slides (such as, e.g., sample slides containing biological samples) can be imaged in parts and the images may be stitched together to form a panoramic image by scanning and imaging systems. Images of the parts may be captured by an optical subassembly, having lens and camera, disposed above the sample slide. The optical subassembly may be, e.g., an optical column, an L-shaped optical assembly which uses prisms in the optical path, or any other suitable optical subassembly. The panoramic image may be stored or transferred for remote viewing. For capturing images of different portions of the sample slide, the sample slide is moved while capturing images so that all parts of the sample area can be scanned and then subsequently stitched together.

For imaging the different portions, the sample slide can be moved along a horizontal plane (defined by the x-axis and the y-axis). The optical subassembly can be moved relative to the sample slide in a vertical direction (defined by the z-axis) to bring the sample slide to the focal length of the lens in the optical subassembly. In some embodiments, while moving in the horizontal plane, the sample slide should remain at the same distance from the optical subassembly with a tolerance of approximately ±1 micron. This is to ensure that the sample slide remains in focus for fields adjacent to the field where focusing was done. Thus, in such embodiments, images can be captured without refocusing at adjacent fields.

In some prior embodiments, a flat x-y actuator may be used to cause movement of the sample slide along the horizontal plane of the stage. For this, the sample slide may be rigidly coupled with the flat x-y actuator. Since the sample slide typically weighs only a few grams, it is difficult to control the motion and accurately position the sample slide for imaging. This may lead to erroneous scanning and blurred images. Further, since the actuator causes movement of the sample slide, the sample slide may be vertically displaced, e.g., due to vibrations of the actuator. Due to the vertical displacement, different portions of the sample slide may be at different horizontal planes leading to a panoramic image having different image quality in different parts.

The present subject matter addresses these and other problems of conventional techniques and provides systems and methods for positioning and imaging of a section of the sample. The positioning system helps in moving the sample slide in a horizontal direction with no or negligible movement in the vertical direction to minimize such displacements and perturbances.

In one embodiment, the positioning system can comprise a cassette, a pusher component, a stage, an actuator, and a processing unit. The sample slide (e.g., a slide containing a sample to be imaged) may be situated above a top surface of the cassette. In one example, the sample may be situated on a sample slide which can be clamped on the top surface of the cassette. In another example, the sample for imaging may be disposed directly on the top surface of the cassette, e.g., where the cassette itself acts as the sample slide. In some embodiments, any element which the pusher component interacts with may be the "cassette" for purposes of this discussion.

In some embodiments, the pusher component may comprise a cut-out portion. The cassette comprising the sample slide clamped thereon can be placed within the cut-out portion. The cassette may be movable within the cut-out portion, i.e., dimensions of the cut-out portion may be more than the dimensions of cassette, enabling movement of the cassette in the cut-out portion. In some embodiments, the pusher component does not grasp, hold, or lock the cassette tightly or firmly, but rather in a snug or semi-firm fit. In some embodiments, at no point is the pusher component able to lift the cassette up.

In some embodiments, the pusher component can be situated above the stage. When the cassette is placed or is situated in the cut-out portion of the pusher component, a bottom surface of the cassette interfaces with a top surface of the stage. The actuator can be coupled to the pusher component. On activation of the actuator, the pusher component causes the cassette to move on the stage for imaging different portions or views of the sample.

In operation, to cause movement of the sample slide along the horizontal plane, the processing unit is configured to send one or more signals to activate the actuator in order to move the pusher component. The movement of the pusher component is to position the cassette for imaging a section of the sample.

Since the sample is provided on the cassette, for example, directly or by using a sample slide, even on vertical displacement of the cassette from the stage caused by the pusher component, the cassette falls back to be in contact with the stage. Hence, on being moved by the pusher component, the cassette falls back along the same horizontal plane. Thus, the horizontal plane of the sample does not change on being moved by the pusher component. This reduces the requirement for accurately controlling the actuator. Further, the pusher component limits the movement of the cassette within the cut-out portion, allowing for improved control of the cassette in the horizontal direction.

The above and other features, aspects, and advantages of the subject matter will be better explained with regard to the following description and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

Figure 1:
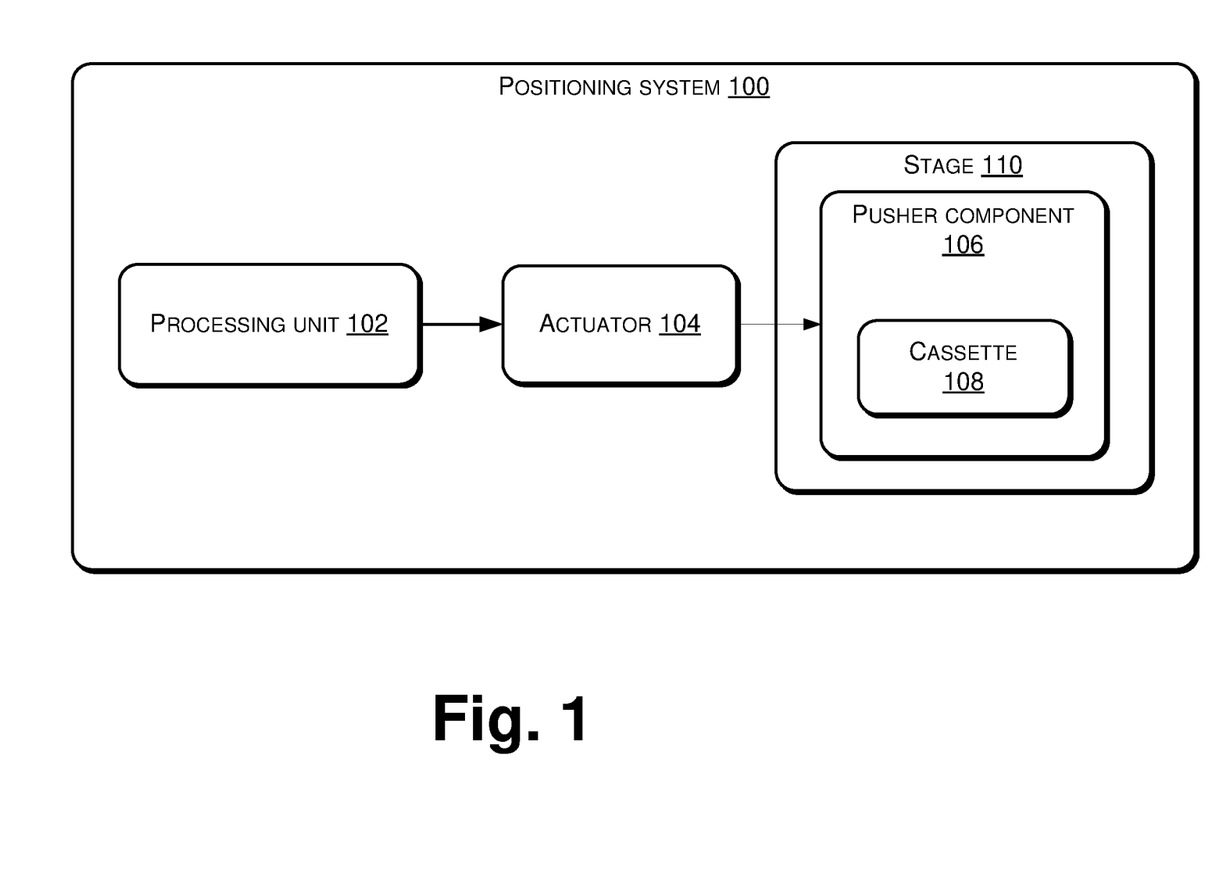
FIG. 1 depicts a block diagram of an example positioning system for creating an image of a sample on a sample slide, in accordance with an example implementation of the present subject matter.

FIG. 1 depicts a block diagram of an example positioning system 100 for creating an image of a sample on a sample slide, in accordance with an implementation of the present subject matter. The positioning system 100 may also hereinafter be referred to as system 100. The positioning system 100 can comprise a processing unit 102, an actuator 104, a pusher component 106, a cassette 108, and a stage 110.

The processing unit 102 may be implemented as one or more microprocessors, microcomputers, microcontrollers, digital signal processors, central processing units, state machines, logic circuitries, and/or any devices that manipulate signals based on operational instructions. Among other capabilities, the processing unit 102 fetches and executes computer-readable instructions stored in a memory. The functions of the various elements shown in the figure, including any functional blocks labeled as processor, may be provided through the use of dedicated hardware as well as hardware capable of executing computer readable instructions.

The processing unit 102 is configured to send one or more signals to activate the actuator 104. The actuator 104 can be coupled to the pusher component 106. Thus, on activation of the actuator 104, pusher component 106 may be moved. The actuator 104 may be a non-flat x-y actuator. In one example, the actuator 104 can include two stepper motors mounted orthogonally such that they provide motion in perpendicular axes, i.e., the x-axis and the y-axis. In other examples, a flat actuator may also be used.

The pusher component 106 can comprise a cut-out portion. In one example, the pusher component 106 may have a plurality of teeth extending from one or more inner walls of the pusher component 106 into the cut-out portion. Example pusher components 106 are explained later with reference to FIGS. 5 and 6. The pusher component 106 helps in accurate and repeatable positioning of the cassette 108 for imaging of the sample slide.

The cassette 108 may be used for supporting and holding the sample to be imaged. In one example, the sample may be provided on a sample slide. In said example, the cassette 108 may comprise a clamp component to clamp the sample slide on the cassette 108 and the sample may be disposed on the sample slide. In another example, the cassette 108 and the sample slide may be integrally formed. For example, provisions can be provided on the cassette 108 to directly receive the sample to be imaged.

The cassette 108 may be placed or situated within the cut-out portion of the pusher component 108. The cassette 108 may be movable within the cut-out portion. The dimensions of the cut-out portion may be larger than the dimensions of the cassette 108. This enables the cassette 108 to move within the cut-out portion of the pusher component 108 when the pusher component 108 is moved in the horizontal direction. However, walls of the pusher component 108 restrict movement of the cassette 108 outside the cut-out portion.

The pusher component 106 may be disposed above the stage 110. In one example, the pusher component 106 may be suspended above and spatially separated from the stage 110. In another example, the pusher component 106 may be disposed on the top surface of the stage 110. When the cassette 108 is placed or situated in the cut-out portion of the pusher component 106, a bottom surface of the cassette 108 can interface with the top surface of the stage 110. A top surface of the cassette 108 may be parallel to the top surface of the stage 110. Thus, on movement of the pusher component 106 on the stage 110, the cassette 108 can move on the stage 110. The top surface of the stage 110 being flat ensures that the horizontal plane of the sample disposed above the cassette 108 is maintained relative to a perpendicular optical subassembly (see below discussion on perpendicularity of optical subassembly 202).

In operation, the processing unit 102 is configured to send one or more signals to activate the actuator 104 in order to move the pusher component 106 which causes movement of the cassette 108 disposed within the cut-out portion of the pusher component 106. The cassette 108 may be fabricated, for example, from annealed float glass and may have a thickness in a range of 6-10 mm. The top surface of the cassette 108 may be made flat and smooth, for example, by lapping, polishing, or grinding.

On movement of the cassette 108 caused by the pusher component 106, even if the cassette 108 is lifted from the top surface of the stage 110, the cassette 108 falls back on the stage 110, e.g., due to gravity, hence maintaining the horizontal plane of the sample slide.

The actuation or activation of the actuator 104 can be controlled to cause the pusher component 106 to bring the cassette 108, i.e., a section of the sample, to a predetermined position. For this, the cassette 108 may first be brought to a crude position by the pusher component 106. The cassette 108 may be first brought to the crude position as the cassette 108 is movable in the cut-out portion of the pusher component 106. For this, the processing unit 102 is configured to provide one or more signals to activate the actuator to cause the pusher component 106 to move along the x-axis, y-axis, or an angle to the x-axis or the y-axis to bring the cassette 106 to the crude position. In one example, the angle varies from 30-60 degrees.

On bringing the cassette 108 to the crude position, the pusher component 106 may be moved to move the cassette 108 so that the cassette is positioned in a predetermined position. In one example, in the predetermined position, the cassette 108 can abut against an inner wall of the pusher component 106. For example, the cassette 108 can abut against one or more teeth extending into the cut-out portion from the inner walls of the pusher component 106. Thus, the teeth in the cut-out portion can help in positioning the cassette 108, and consequently the sample, in the predetermined position for accuracy in imaging different portions of the sample slide. In some embodiments, the teeth may be on the pusher component, while on other embodiments the teeth may be on the cassette or some other component.

Figure 2:
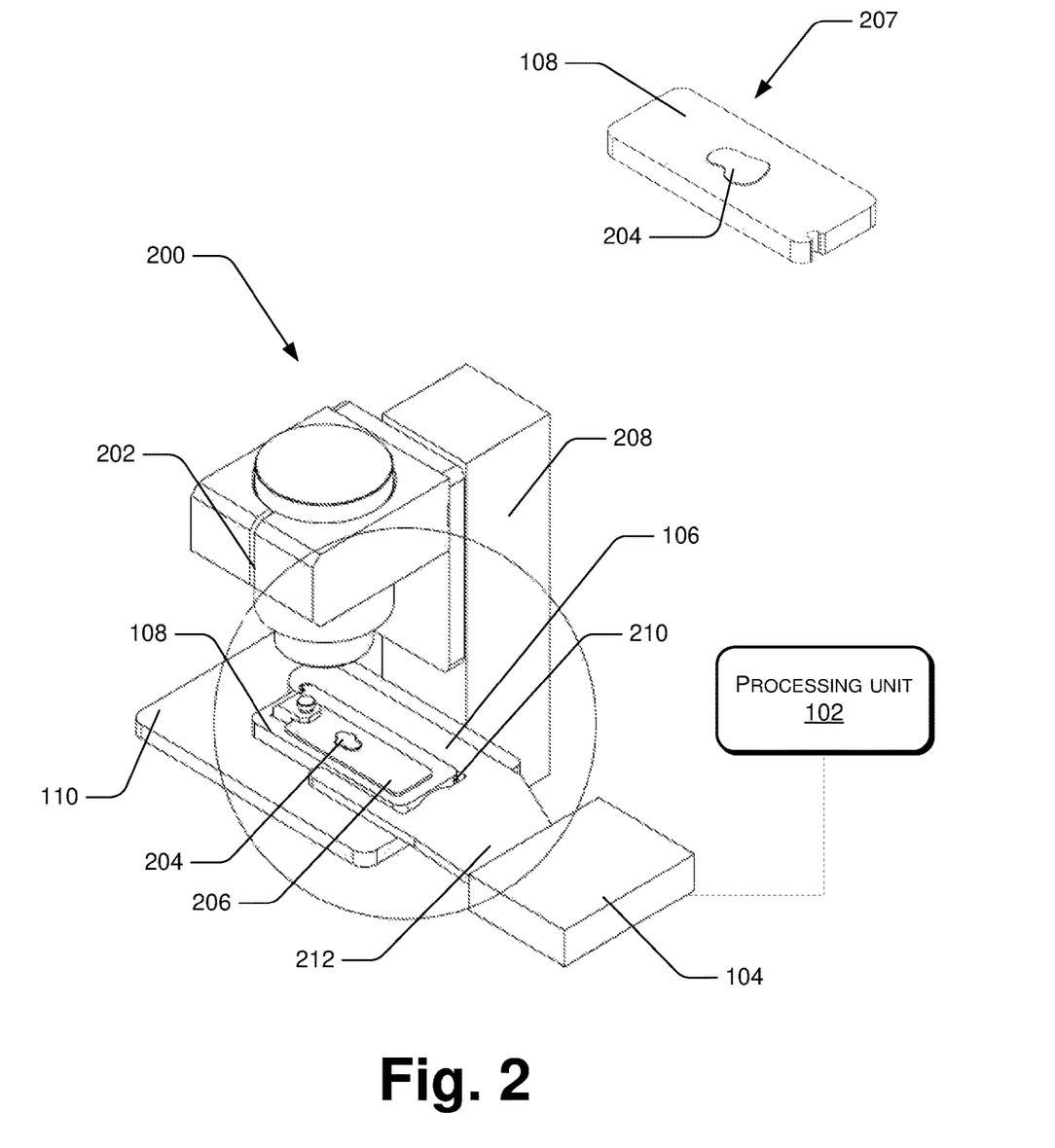
FIG. 2 depicts a schematic of an example microscope comprising the positioning system for creating the image, in accordance with an implementation of the present subject matter.

FIG. 2 depicts a schematic of an example microscope 200 comprising the positioning system 100 for creating the image, in accordance with an implementation of the present subject matter. The microscope 200 comprises an optical subassembly 202 disposed above the stage 110 to acquire images of a sample 204 provided on a sample slide 206. While FIG. 2 depicts that the sample 204 is provided on the sample slide 206, other configurations are possible. For example, in some embodiments, the sample 204 may be provided on a top surface of the cassette 108 as shown in inset 207. Further, in some embodiments, while FIG. 2 depicts a single cassette 108 provided on the stage 110, one or more additional cassettes can be provided next to each other for imaging. One or more additional sample slides can be located on the one or more additional cassettes. Further, one or more additional sample slides 206 may also be disposed on the same cassette 108. For example, the cassettes 108 may be provided adjacent to each other, with or without multiple inner walls of the pusher component 106 separating them such that in the predetermined position of each cassette, the cassette abuts against a respective inner wall of the pusher. In some embodiments, the optical subassembly 202 can comprise one or more lenses and one or more cameras to focus on the sample 204 and capture images of the sample 204.

In some embodiments, the optical subassembly 202 may be spatially separated from the stage 110. The optical subassembly 202 may be mounted on a rail 208. The rail 208 may support the optical subassembly 202 and help in causing movement of the optical subassembly 202 relative to the stage 110 in the vertical direction. Distance between the optical subassembly 202 and the stage 110 can be adjusted so that the sample 204 may be at a focal length of the lens and images may be captured at the focal plane corresponding to the focal length.

In some embodiments, the top surface of the stage 110 may be perpendicular to the optical axis of the optical subassembly 202. The perpendicularity of the top surface of the stage 110 with the optical subassembly 202 helps in ensuring that an image of a field captured has uniform sharpness or crispness.

The perpendicularity of the top surface of the stage 110 may be set for each sample 204 being imaged. In another example, the perpendicularity of the top surface of the stage 110 may be set while calibrating the positioning system 100, for example, by a manufacturer.

To set the perpendicularity, a plurality of tuning screws (not shown) may be provided below the stage 110. For setting the perpendicularity, an image of a portion of the sample 204 may be captured. The processing unit 102 can evaluate the crispness of the image. Based on the variation of crispness value, a tilt angle of the top surface of the stage 110 can be determined.

For example, for a field of view of the optical subassembly 202, an image of the sample 204 may be obtained. There may be a variation in the crispness value across the image when the stage 110 is tilted. For example, for a first image, a right side of the image may have a higher crispness value than a left side of the image. This may indicate that the right side of the stage 110 may be tilted with reference to the left side. Depending on the tilt angle obtained using the crispness value of the plurality of images, the perpendicularity of the stage 110 may be adjusted. The tuning screws may be used to set the perpendicularity until the different portions of the image have uniform crispness.

In the microscope 200, the pusher component 106 may be situated on the top surface of the stage 110. The sample slide 206, having the sample 204 to be imaged, may be coupled on the cassette 108. The cassette 108 may be situated within the cut-out portion 210 of the pusher component 106. The pusher component 106 may be coupled to the actuator 104, for example, via an arm 212.

The actuator 104 can cause the pusher component 106 to move above the stage 110. In one embodiment, acceleration and deceleration provided by the actuator 104 to the pusher component 106 may be calibrated, for example, by a manufacturer. This is explained further with reference to FIGS. 7(a) and 7(b). Further, the deceleration may be calibrated such that the deceleration of the pusher component 106 is less than the deceleration of the cassette 108, e.g., due to friction between the bottom surface of the cassette 108 and the top surface of the stage 110 to prevent the cassette 108 from losing contact with the teeth of the pusher component 106 during motion in the direction of no compensation, as described below with respect to FIG. 8(b) and FIG. 8(c).

Figure 3A:
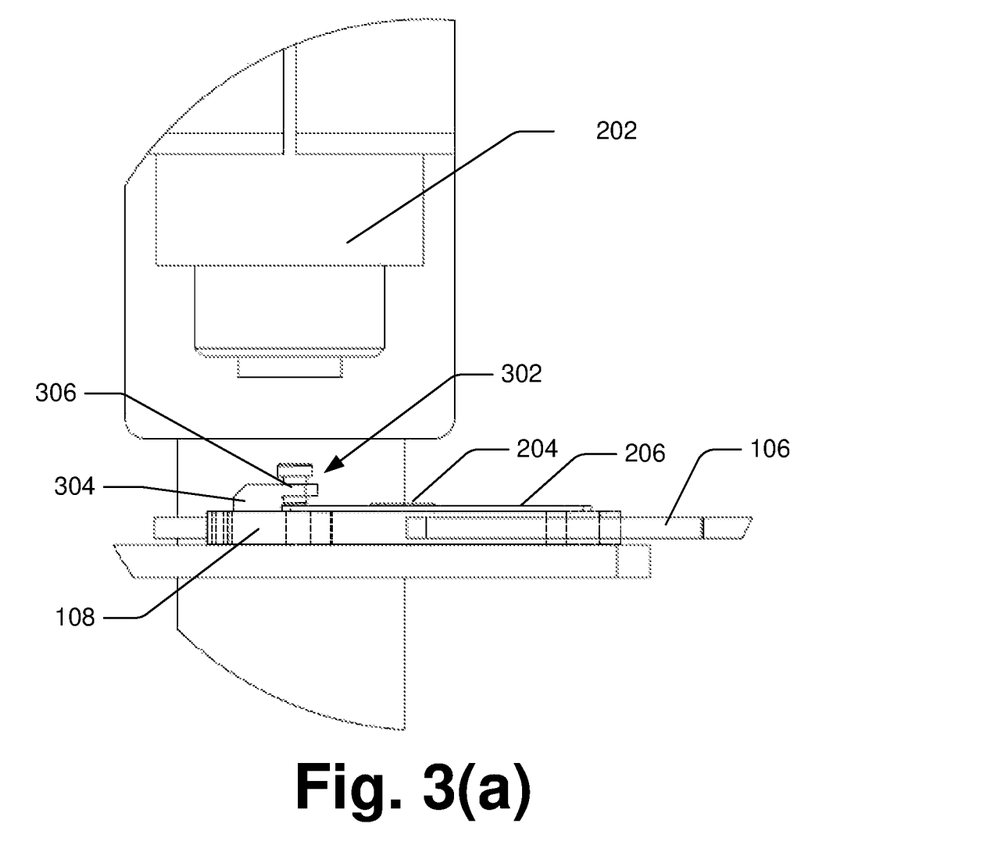
FIG. 3(a) depicts a side-view of the sample slide coupled to an example cassette, in accordance with an example implementation of the present subject matter.

FIG. 3(a) depicts an example side-view of the sample slide 206 coupled to the cassette 108, in accordance with an implementation of the present subject matter. As can be seen from FIG. 3(a), in some embodiments, the sample slide 206 may be clamped on a top surface of the cassette 108. For this, the top surface of the cassette 108 can comprise a clamp component 302.

In one embodiment, the clamp component 302 may have a first support portion 304 substantially perpendicular to the cassette 108. A second support portion 306 may extend perpendicularly from the first support portion 304. The second support portion 306 may be spatially separated from the top surface of the cassette 108. The second support portion 306 may have an aperture provided to receive a bolt to clamp the sample slide 206 on the top surface of the cassette 108. While FIG. 3(a) depicts an example clamp component 302, other clamp components 302 may also be used, for example, retractable clips and the like. Further, while FIG. 3(a) depicts that a single clamp component is provided, multiple clamp components may also be used to better secure the sample slide 206 on the cassette 108.

Figure 3B:
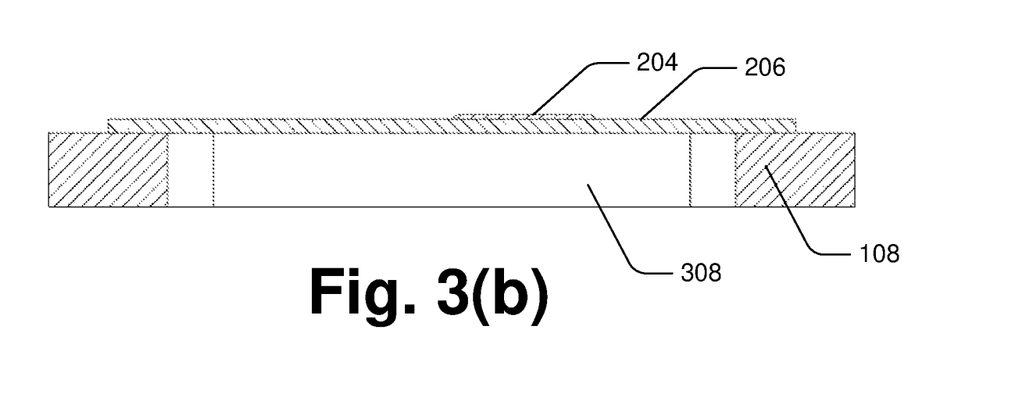
FIG. 3(b) depicts a cross-sectional view of an example cassette, in accordance with an example implementation of the present subject matter.

While FIG. 3(a) depicts that the cassette 108 is a slab-like structure, other configurations are possible. FIG. 3(b) depicts a cross-sectional view of an example cassette 108 comprising a central hollow section 308, in accordance with an implementation of the present subject matter. The hollow section 308, in one embodiment, can extend throughout the thickness of the cassette 108. In another example, the hollow section 308 may extend partially throughout the thickness of the cassette 108. The hollow section 308 reduces the optical path of the light that reaches the sample 204 disposed on the cassette 108.

Dimensions of the hollow section 308 may be smaller than the sample slide 206. The cassette 108 as shown in FIG. 3(b) may not include a clamp component 302 as shown in FIG. 3(a). In said example, the sample slide 206 may be coupled to the cassette 108 by other means, for example, by using chemical adhesives, air pressure, vacuum, ultrasonic pressure, and the like. In one example, the hollow section 308 can have a substantially rectangular shape. However, other shapes are possible.

Figure 3C:
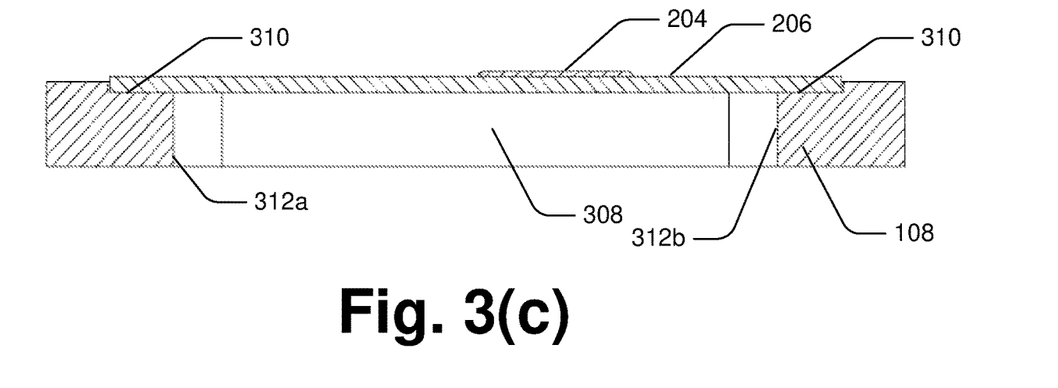
FIG. 3(c) depicts a side view of another example cassette, in accordance with an example implementation of the present subject matter.

FIG. 3(c) depicts a cross-sectional view of another example cassette 108, in accordance with an implementation of the present subject matter. In the example cassette 108 shown in FIG. 3(c), the cassette 108 may comprise the hollow section 308 extending through the length of the cassette 108. At the top surface of the hollow section 308, a groove 310 may be formed. In one embodiment, the groove 310 may border the hollow section 308. For example, the groove 310 may border the hollow section 308 at a first side 312a and a second side 312b of the hollow section 308. The first side 312a and the second side 312b may be opposite to each other. The groove 310 may be configured to form-fit the sample slide 206 and mitigate the requirement of the clamp component 302 as shown in FIG. 3(a).

Figure 3D:
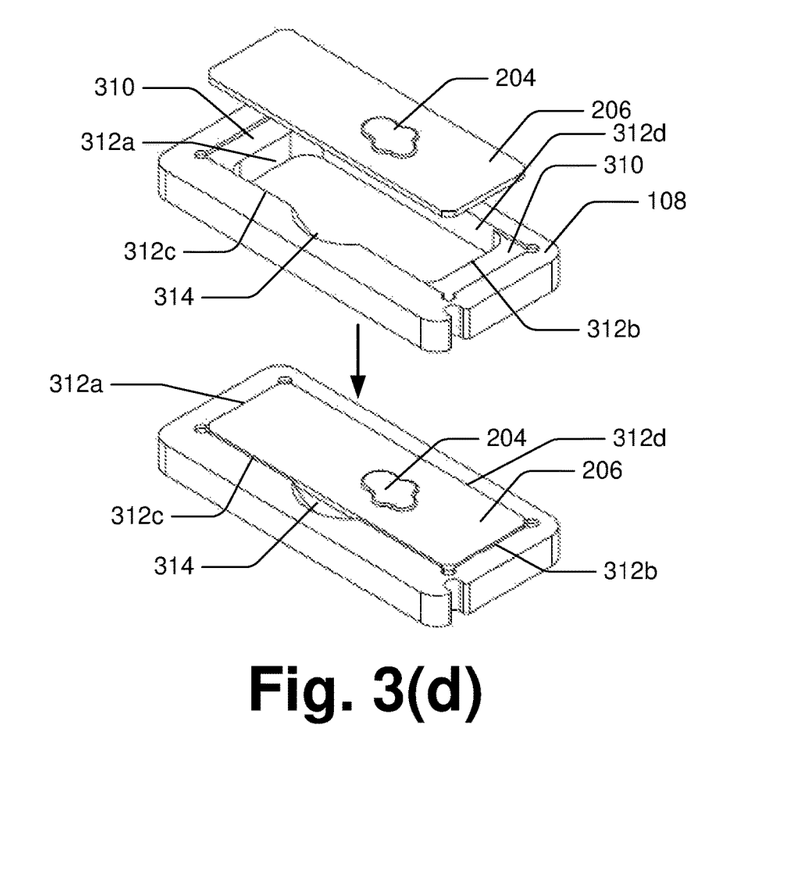
FIG. 3(d) depicts an isometric view of the example cassette depicted in FIG. 3(c), in accordance with an example implementation of the present subject matter.

FIG. 3(d) depicts an isometric view of the cassette 108 shown in FIG. 3(c), in accordance with an implementation of the present subject matter. As can be seen in FIG. 3(c), in some embodiments, the top surface of the cassette 108 can comprise a recess 314 provided on the top surface of the cassette 108. For example, the recess 314 may be provided on a third side 312c of the hollow section 308. In one example, the third side 312c may be substantially perpendicular to the first side 312a and the second side 312b. In another example, although not shown in FIG. 3(d), the recess 314 may also be provided on a fourth side 312d. The fourth side 312d of the hollow section 308 may be opposite to the third side 312c.

Figure 4A:
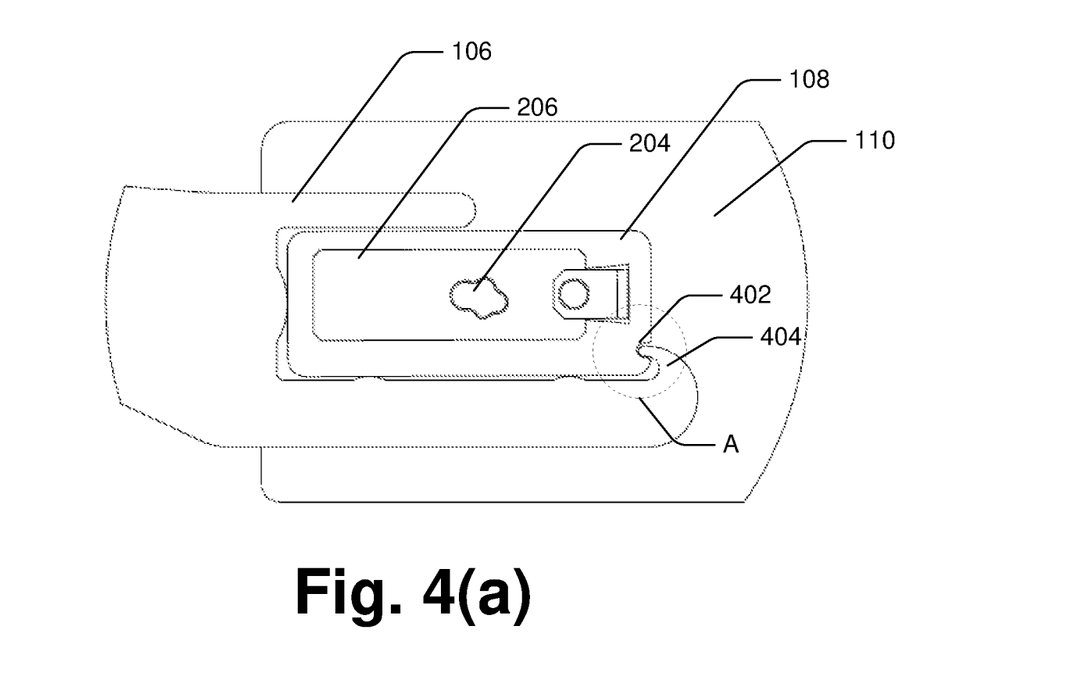
FIG. 4(a) depicts a top-view of the sample slide coupled to the cassette, in accordance with an example implementation of the present subject matter.

FIG. 4(a) depicts a top-view of the sample slide 206 coupled to the cassette 108, in accordance with an implementation of the present subject matter. In one example, as can be seen from part A in FIG. 4(a), the cassette 108 can comprise a slot 402 to receive a hook 404 of the pusher component 106. The slot 402 may extend from the top surface of the cassette 108 to a bottom surface of the cassette 108. The slot 402 may be provided in a wall at a first end of the cassette 108 to interface with the hook 404. The cassette 108 may also comprise a first tooth and a second tooth configured to interface with the pusher component 106 (not shown).

Figure 4B:
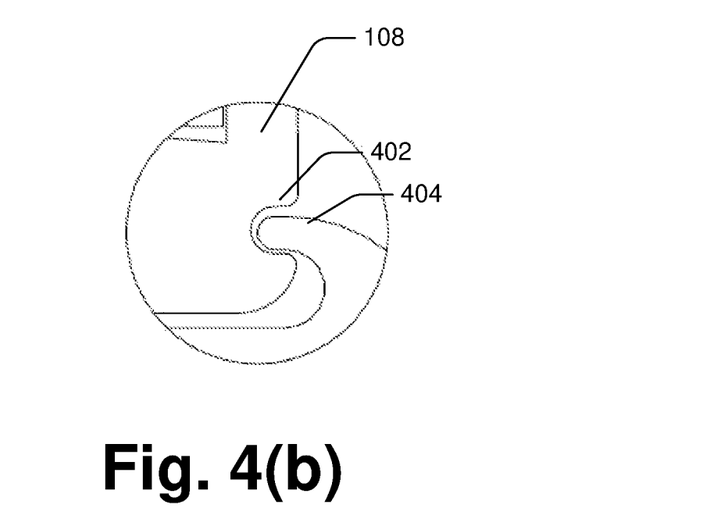
FIG. 4(b) depicts an exploded view of the part A of FIG. 4(a), in accordance with an example implementation of the present subject matter.

FIG. 4(b) depicts an exploded view of the part A of FIG. 4(a), in accordance with an implementation of the present subject matter. As can be seen, while the hook 404 interfaces with the slot 402, the hook 404 may not form-fit in the slot 402. Thus, the cassette 108 may be movable in the cut-out portion 210 of the pusher component 106. In an alternate embodiment, the hook may be present on the cassette 108 that interfaces with a slot provided on the pusher component 106. In some embodiments, multiple such hook-slot combinations may be present on the cassette walls and/or pusher component.

Figure 5:
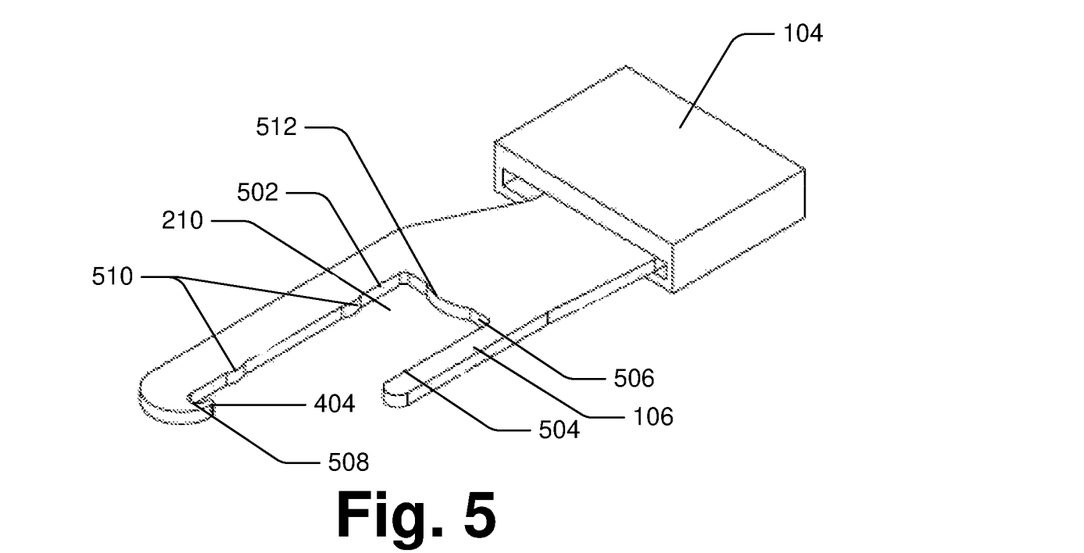
FIG. 5 depicts an isometric view of an example pusher component, in accordance with an example implementation of the present subject matter.

FIG. 5 depicts an isometric view of an example pusher component 106, in accordance with an implementation of the present subject matter. The pusher component 106, as shown in FIG. 5 comprises a first inner wall 502, a second inner wall 504, a third inner wall 506, and a fourth inner wall 508. The second inner wall 504 may be opposite to the first inner wall 502. The first inner wall 502 can comprise a first tooth 510 extending into the cut-out portion 210. In one example, the first inner wall 502 may comprise two first teeth extending into the cut-out portion 210. However, any number of first teeth may be provided. In one example, the first tooth 510 may be semi-circular. However, other shapes may also be used. The second inner wall 504 may be opposite to the first inner wall 502. A length of the second inner wall 504 may be less than a length of the first inner wall 502.

The third inner wall 506 may be substantially orthogonal to the first inner wall 502 and the second inner wall 504. The third inner wall 506 may comprise a second tooth 512 extending into the cut-out portion 210. The second tooth 512 may be semi-circular. However, other shapes are possible. In one example, a diameter of the first tooth 510 may be less than a diameter of the second tooth 512.

The fourth inner wall 508 may be provided opposite to the third inner wall 506. The fourth inner wall 508 may be substantially orthogonal with the first inner wall 502. The fourth inner wall 508 can comprise the hook 404 extending into the cut-out portion 210. As previously explained, the hook 404 may interface with the slot 402 of the cassette 108.

Figure 6:
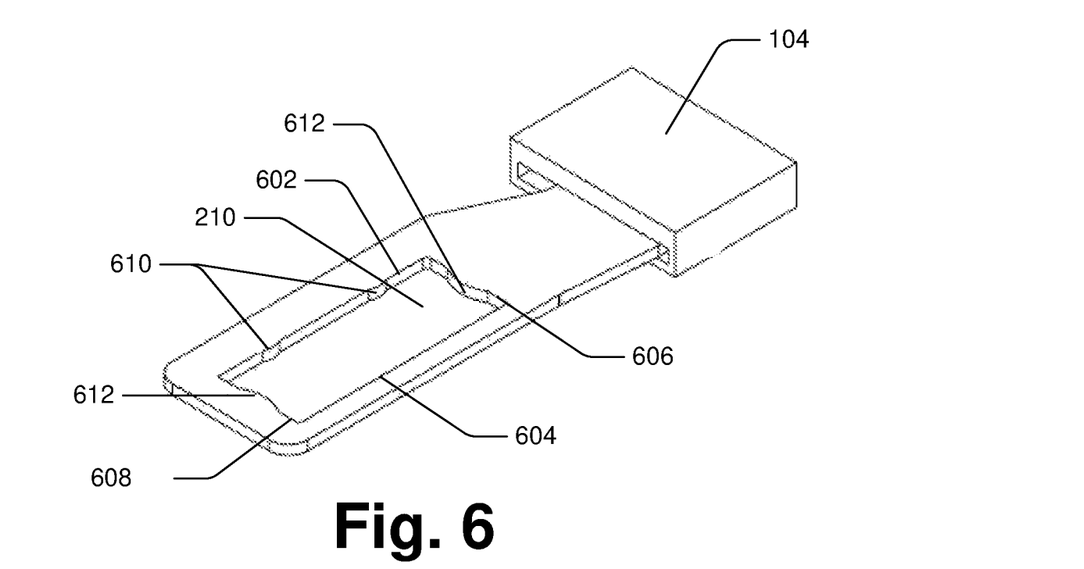
FIG. 6 depicts a top view of another example pusher component, in accordance with an example implementation of the present subject matter.

FIG. 6 depicts an isometric view of an example pusher component 106, in accordance with an implementation of the present subject matter. The pusher component 106, as shown in FIG. 6, can comprise a first inner wall 602, a second inner wall 604, a third inner wall 606, and a fourth inner wall 608. The first inner wall 602 and the second inner wall 604 may be provided opposite to each other.

The first inner wall 602 comprises a first tooth 610 extending into the cut-out portion 210. In one example, the first inner wall 602 may comprise two first teeth extending into the cut-out portion 210. However, any number of first teeth may be provided. In one example, the first tooth 610 may be semi-circular. However, other shapes may also be used. In one example, the second inner wall 604 can comprise a first tooth extending into the cut-out portion 210. In said example, the first teeth in the second inner wall 604 may be opposite to the first teeth in the first inner wall 602.

The third inner wall 606 and the fourth inner wall 608 may be provided opposite to each other. The third inner wall 606 and the fourth inner wall 608 may be substantially orthogonal to the first inner wall 602 and the second inner wall 604. The third inner wall 606 and the fourth inner wall 608 may each comprise a second tooth 612 extending into the cut-out portion 210. The second tooth 612 may be semi-circular. However, other shapes are possible. The second tooth extending from the third inner wall 606 and the fourth inner wall 608 may be opposite to each other.

In operation, with reference to FIGS. 1, 2, 3(a)-(d), 4(a)-(b), 5, and 6, the processing unit 102 is configured to send one or more signals to activate the actuator 104 to move the pusher component 106 and the cassette 108 in the horizontal plane in order to position the cassette 108 for imaging a section of the sample 204. The actuator 104 may be controlled to cause the pusher component 106 to bring the sample slide 206 and the sample 204 to a predetermined position. For example, the predetermined position in the horizontal direction may correspond to coordinates (x, y). At the predetermined position, the image of the sample 204 in the field of the view of the lens may be captured.

To bring the sample slide 206 to the predetermined position, the sample slide 206 may first be brought to a crude position. For example, the crude position may correspond to $(x_1, y_1)$ where $x_1 = x \pm \Delta x$; and $y_1 = y \pm \Delta y$. The $\Delta x$ and $\Delta y$ may be because of movability of the cassette 108 within the cut-out portion 210. To bring the sample slide 206 to the crude position, one or more signals of the processing unit 102 may be configured to activate the actuator 104 to cause the pusher component 106 to move along the x-axis, y-axis, or at an angle to the x-axis or the y-axis.

When the pusher component 106 is moved by the actuator 104, the pusher component 106 may or may not cause the cassette 108 to lift from the top surface of the stage 110. However, the cassette 108 falls back on the top surface of the stage 110, e.g., due to gravity, so that the sample slide 206 remains along the same horizontal plane. The horizontal plane may correspond to the focal plane of the lens of the optical subassembly 202 which may be parallel to the top surface of the stage 110.

On reaching the crude position $(x_1, y_1)$, the actuator 104 may be activated to cause the pusher component 106 to move the cassette 108 so that the cassette 108 is positioned in the predetermined position (x, y). In one example, the actuator 104 may be activated to cause diagonal movement of the cassette 108 to position the cassette 108 in the predetermined position. In one example, the diagonal movement may be in a range of 30-60 degrees to the x-axis or the y-axis. In one example, for positioning the cassette 108 at the pre-determined position, there may be a back and forth movement in the diagonal direction. Thus, the diagonal movement of the pusher component 106 adjusts and compensates for the $\Delta x$ and $\Delta y$. In the predetermined position, the cassette 108 may abut against the first tooth 510, 610 and the second tooth 512, 612 extending from the first inner wall 502, 602 and the third inner wall 506, 606, respectively.

Figure 7A:
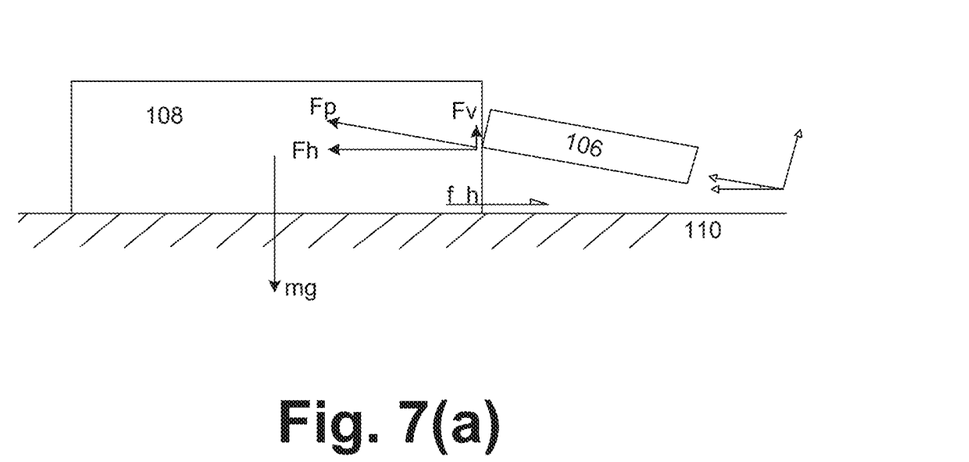
FIG. 7(a) depicts a first mechanism of pushing by the pusher component, in accordance with an example implementation of the present subject matter.

In one embodiment, while the surface of pusher component 106 is parallel to the top surface of the stage 110, in other examples, to reduce friction between the various surfaces, the pusher component 106 may be at an angle to the stage 110. FIG. 7(a) depicts a first mechanism of movement by the pusher component 106, in accordance with an implementation of the present subject matter. As shown in FIG. 7(a), the pusher component 106 may be inclined with reference to the stage 110. In this case, plane of motion of the pusher component 106 is not parallel to the top surface of the stage 110. This may be caused, for example, due to non-planarity or non-linearity produced by the actuator 104. In this case, forces provided by the actuator 104 may be transferred to the cassette 108 at an angle. The forces $F_p$ provided by the actuator 104 can be resolved to horizontal component $F_h$ and vertical component $F_v$. The vertical component $F_v$ is undesirable and can lead to lifting off the cassette 108. However, since the cassette 108 is of considerable weight (marked as "mg" in FIGS. 7(a) and 7(b)) compared to the friction component fh_it falls back on the stage 110 due to gravity.

In one embodiment, to prevent or reduce lifting of the cassette 108, i.e., to overcome the vertical component $F_v$, an area of contact between the pusher component 106 and walls of the cassette 108 can be increased. Further, to reduce frictional forces between the walls of the cassette 108 and the pusher component 106, the walls of both the cassette 108 and the pusher component 106 may be made smooth.

Figure 7B:
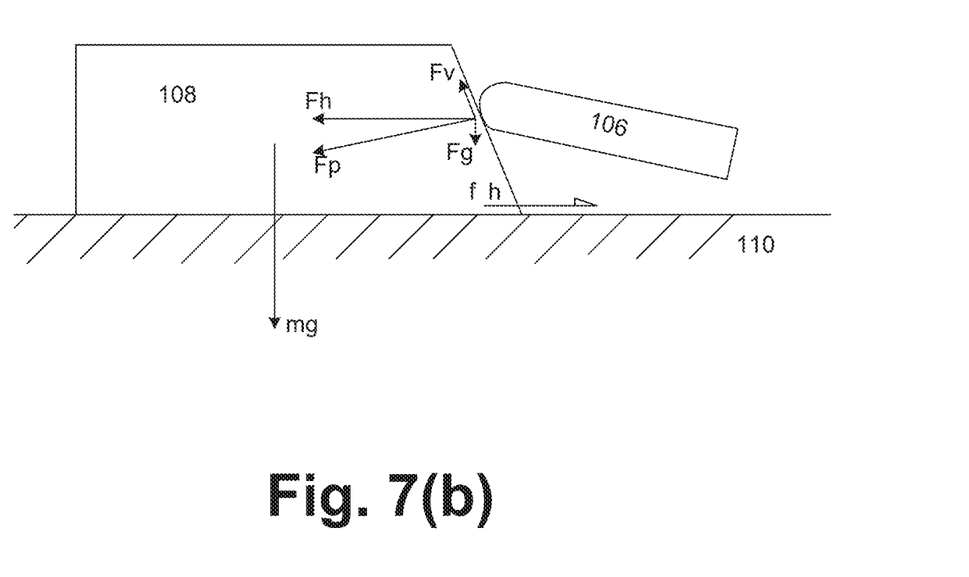
FIG. 7(b) depicts a second mechanism of pushing by the pusher component, in accordance with an example implementation of the present subject matter.

In another example, as shown in FIG. 7(b), frictional forces between the walls of the cassette 108 and the pusher component 106 may be reduced by rounding the walls of the pusher component 106 or angling the walls of the cassette 108 or both. For example, a bevel may be provided along the walls of the cassette 108.

Figure 8A:
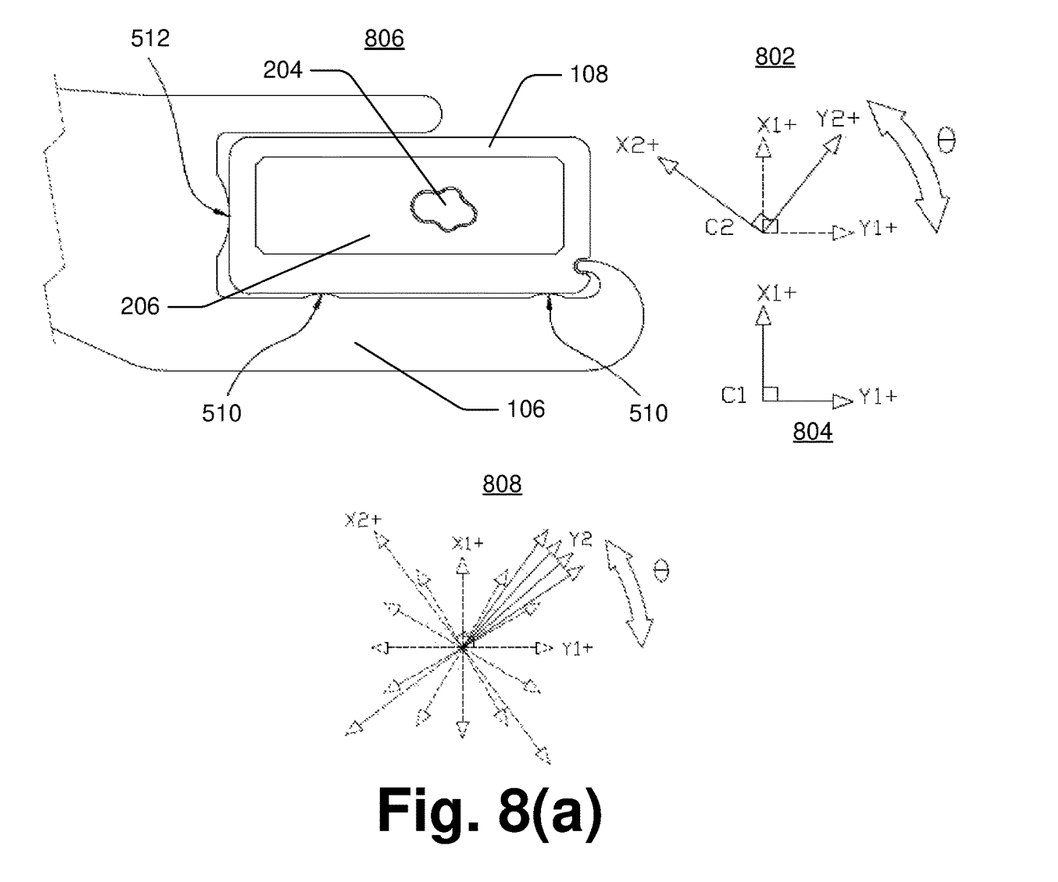
FIG. 8(a) depicts a first motion along the horizontal direction, in accordance with an example implementation of the present subject matter.

The crude positioning and final positioning are further explained with reference to FIGS. 8(a), 8(b), and 8(c). FIG. 8(a) depicts a first motion along the horizontal direction, in accordance with an implementation of the present subject matter. With reference to FIG. 8(a), the pusher component 106 may be moved along the Y2 and X2 axis only. Y2+ and X2+ may be part of the coordinate system C2 shown as bold lines in inset 802. The coordinate system C2 may be set at an angle θ to the coordinate system C1 shown in inset 804. X1+ and Y1+ may be part of the coordinate system C1 shown as bold lines in inset 804. The angle θ can be in a range of 30-60 degrees.

The angle θ may be defined, in one embodiment, based on contact with the inner walls of the pusher component 106. In another embodiment, the angle θ may be based on the position of the first tooth 510, 610 and the second tooth 512, 612 extending from inner walls of the pusher component 106 into the cut-out portion 210. The angle θ may be selected so that the cassette 108 contacts the inner wall of the cut-out portion 210. In one embodiment, the angle θ may be selected so that the cassette 108 contacts at least the first tooth 510, 610 and the second tooth 512, 612 of the pusher component 106, shown as inset 806 for reference.

In some embodiments, in order to ensure contact with a minimum number of teeth extending from the inner walls of the pusher component 106, motion towards Y2 may be maximized while minimizing motion in other directions. The other directions are shown in inset 808. This can be done by scanning continuous sets of images of the sample along the Y2 direction, also referred to as direction of no compensation, while all other directions may be used only for intermediate motion. This is explained further with reference to FIG. 8(b).

Figure 8B:
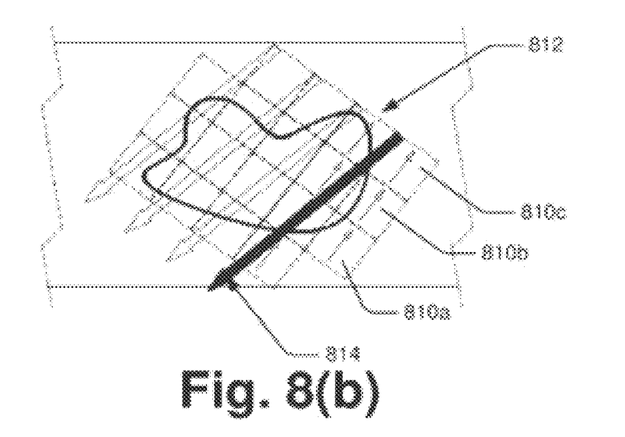
FIG. 8(b) an illustration of the first motion, in accordance with an example implementation of the present subject matter.

FIG. 8(b) depicts an example movement of cassette 108 along the first motion as shown in FIG. 8(a), in accordance with an implementation of the present subject matter. With reference FIG. 8(b), each square depicts a field of view of the optical subassembly 202. For imaging, the cassette 108 may be moved such that square 810a is provided below the optical subassembly. The cassette 108 may then be moved in the direction of the arrow, which corresponds to direction Y2+ shown in inset 802 of FIG. 8(a), to capture images of fields of view of 810b and 810c.

On capturing images of fields of view along column 810, i.e., field of views 810a, 810b, and 810c, to capture the fields of view in the adjacent column, i.e., 812, the cassette 108 may be moved in a direction indicated by the bigger arrows 814. Thus, images of the sample may be taken along the Y2 direction, also referred to as direction of no compensation, while all other directions may be used only for intermediate motion.

Figure 8C:
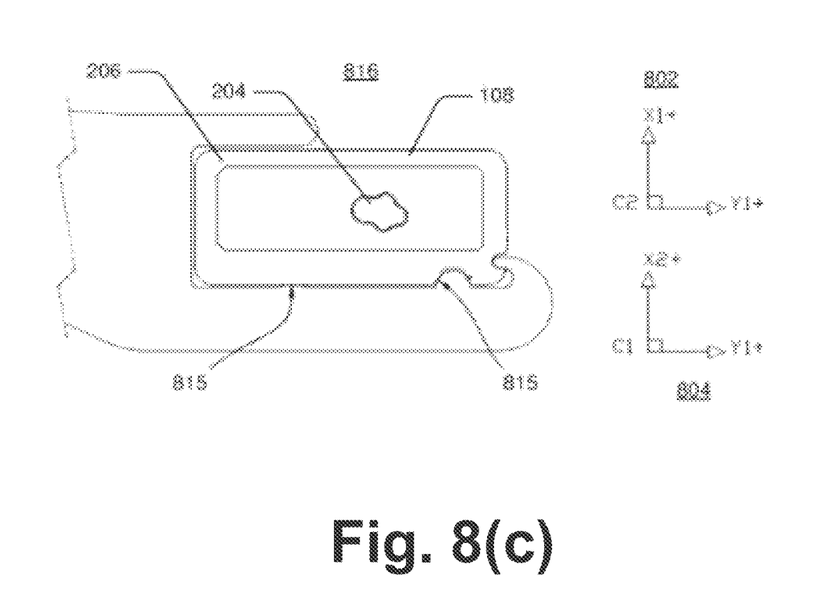
FIG. 8(c) depicts a second motion along the horizontal direction for imaging different portions of the sample slide, in accordance with an example implementation of the present subject matter.

FIG. 8(c) depicts a second motion along the horizontal direction, in accordance with an implementation of the present subject matter. In some embodiments, in the movement pattern as shown in FIG. 8(c), angle θ between coordinate system C1 and C2 may be zero degrees, i.e., the cassette 106 may be moved along the x-axis or y-axis. In said embodiment, to ensure contact with the teeth of the pusher component 106, compensatory motion is performed.

The compensatory motion may be made, for example, in the direction Y2 of coordinate system C2 shown in FIG. 8(a). The compensatory motion may also vary depending on the position of the teeth 815 of the pusher component 106. For example, with reference to inset 816 in FIG. 8(c), the compensatory motion may be in the X1+ direction. This compensatory motion helps in realigning the cassette 108 with respect to the pusher component 106 when coordinate system C2 is at zero degrees to coordinate system C1. Realignment helps in achieving repeatability in the position of the cassette 108 for imaging of different portions of the slide.

In one example, co-focal areas on the sample slide 206 may be imaged. For example, in sample 204 having different thicknesses on the sample slide 206, portions along the same focal plane may be imaged first followed by portions having other thicknesses. To adjust the focal plane for different thicknesses of the sample 204 on the sample slide 206, the optical subassembly 202 may be moved relative to the stage 110 in the vertical direction.

Thus, as described above, the present subject matter provides for systems and methods for positioning and imaging different portions of the sample slide. The systems and methods help in accurately aligning different portions of the sample slide with respect to the optical subassembly so that the images of the sample slide are captured at the focal plane. This helps in improving the quality of images obtained. Further, the systems include components which considerably reduce the cost of scanners and digital imaging systems.

Figure 9:
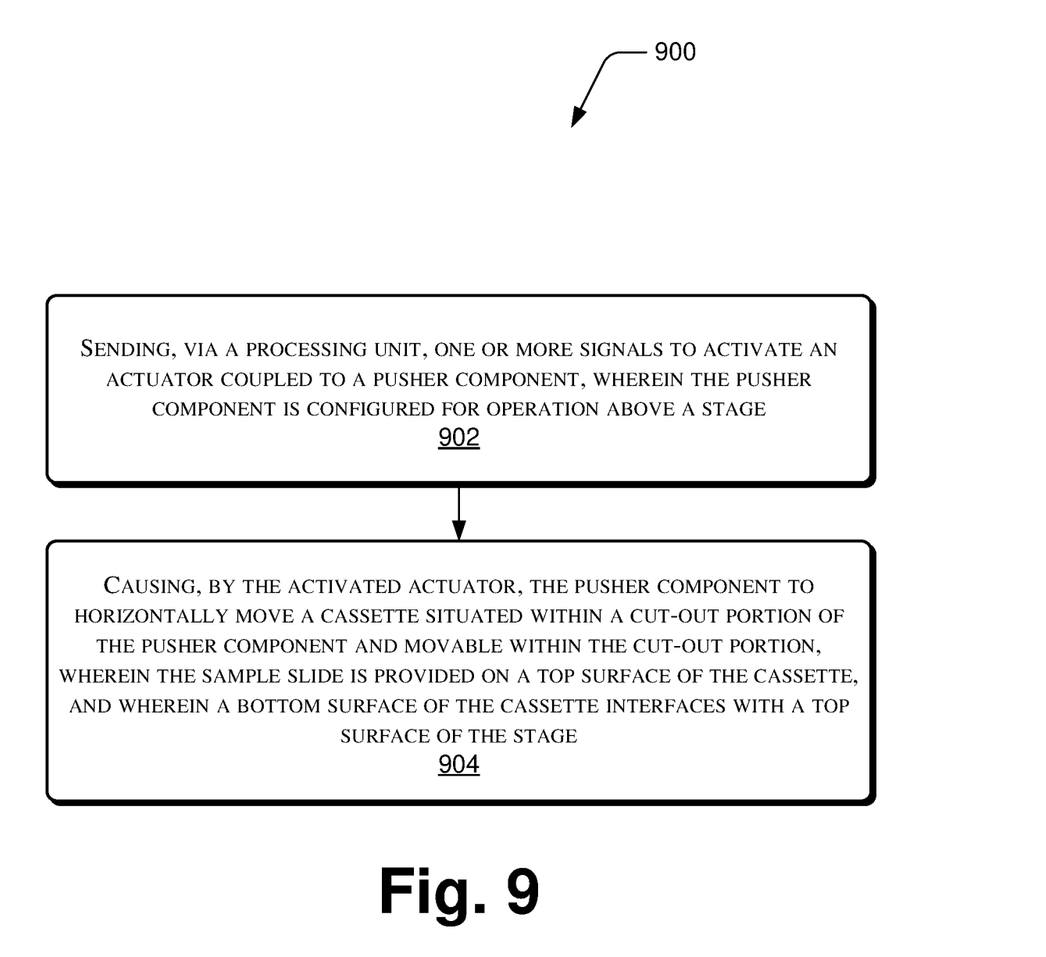
FIG. 9 depicts a method for positioning a sample slide for imaging in a microscope, in accordance with an example implementation of the present subject matter.

FIG. 9 depicts a method 900 for positioning a sample slide for imaging in a microscope, in accordance with an implementation of the present subject matter. The order in which the method 900 is described is not intended to be construed as a limitation, and any number of the described method blocks can be combined in any order to implement the method 900 or an alternative method. Additionally, individual blocks may be deleted from the method 900 without departing from the spirit and scope of the subject matter described herein. Furthermore, the method 900 may be implemented in any suitable hardware, computer readable instructions, firmware, or combination thereof. For discussion, the method 900 is described with reference to the implementations illustrated in FIGS. 1, 2, 3(a)-(d), 4(a)-(b), 5, 6, 7(a)-(b), 8(a)-(c) and 9.

A person skilled in the art will readily recognize that blocks of the methods 900 can be performed by programmed computers. Herein, some examples are also intended to cover program storage devices and non-transitory computer readable medium, for example, digital data storage media, which are computer readable and encode computer-executable instructions, where said instructions perform some or all of the blocks of the described method 900. The program storage devices may be, for example, digital memories, magnetic storage media, such as magnetic disks and magnetic tapes, hard drives, or optically readable digital data storage media.

With reference to method 900, at block 902, the method 900 comprises sending one or more signals to activate an actuator coupled to a pusher component. The pusher component is configured for operation above a stage. In one example, the processing unit 102 can send one or more signals to activate the actuator 104 to cause the pusher component 106 to bring the cassette 108 in the predetermined position. The method 900, at block 904, comprises causing, by the activated actuator, the pusher component to move a cassette. The cassette may be cassette 108 which can be situated in cut-out portion 210 of the pusher component 106 and which is movable within the cut-out portion 210. The sample can be provided on the cassette 108, for example, directly or by using the sample slide 204. The bottom surface of the cassette 108 interfaces with the top surface of the stage 110.

The activated actuator may cause the pusher component 106 to move the cassette 106 to a predetermined position. The activated actuator can cause the pusher component 106 to move the cassette to the predetermined position in two steps-a first step to bring the cassette 106 to a crude position; and a second step to bring the cassette 106 to the predetermined position. The predetermined position may be the position at which a portion of the sample 204 is to be captured.

To bring the sample to the crude position, the method 900, can comprise sending one or more signals to activate the actuator to cause the pusher component to move along x-axis, y-axis, or at an angle to the x-axis or y-axis to bring the cassette to a crude position. For example, with reference to FIG. 8(c) as well as FIG. 8(a), the pusher component 106 may be moved along the x-axis or the y-axis as shown in coordinate system C1 or the angle θ to the x-axis or y-axis as shown with reference to coordinate system C2. The angle θ can vary in a range of 30-60 degrees.

On bringing the sample to the crude position, the method 900 comprises sending one or more signals to activate the actuator to cause the pusher component to move so that the cassette is brought to the predetermined position. The pusher component 106 may be moved, for example, diagonally to bring the cassette 108 in contact with inner walls of the pusher component 106. In one example, in the predetermined position, the cassette 108 may be in contact with the first tooth 510, 610 and the second tooth 512, 612 extending from the inner walls of the pusher component 106.

Thus, different portions of the sample 204 may be brought to the predetermined position for capturing images of a positioned section of sample 204. The images may be stitched with one or more additional images corresponding to positioned sections of the sample to obtain a panoramic image of the sample 204. The method 900, thus, helps in moving different portions of the sample 204 under the field of view of the optical subassembly 202 in the horizontal direction on the stage 110. In one example, prior to capturing images along the horizontal direction, the sample 204 may be brought to the focal plane with reference to the lens in the optical subassembly 202.

In some embodiments, co-focal areas on the sample 204 may be imaged. For example, if the sample 204 has different thicknesses, portions along the same focal plane may be imaged first followed by portions having other thicknesses. To adjust the focal plane for different thicknesses of the sample 204 on the sample slide 206, the optical subassembly 202 may be moved relative to the stage 110 in the vertical direction.

Although the subject matter has been described in considerable detail with reference to certain examples and implementations thereof, other implementations are possible. As such the scope of present subject matter should not be limited to the description of preferred examples and implementations contained therein.

We claim:

1. A positioning system for a microscope, the positioning system comprising:
    a cassette, wherein a sample is to be provided on the cassette;
    wherein the cassette comprises a hollow section extending partially or through a thickness of the cassette;
    a pusher component comprising a cut-out portion, wherein the cassette is situated within the cut-out portion of the pusher component, and wherein the cassette is movable within the cut-out portion;
    a stage, wherein the pusher component is disposed above the stage, wherein when the cassette is situated in the cut-out portion, a bottom surface of the cassette interfaces with a top surface of the stage;
    an actuator coupled to the pusher component, wherein upon the actuator being activated, the pusher component causes horizontal movement of the cassette along the top surface of the stage; and
    a processing unit configured to send one or more signals to activate the actuator in order to move the pusher component and position a section of the sample for imaging.

2. The positioning system of claim 1, wherein the sample is disposed on a sample slide.

3. The positioning system of claim 1, wherein the cassette comprises a clamp component to clamp the sample slide on the top surface of the cassette.

4. The positioning system of claim 1, wherein the pusher component comprises teeth extending from an inner wall of the pusher component into the cut-out portion.

5. The positioning system of claim 1, wherein the pusher component comprises:
    a first inner wall and a second inner wall provided opposite to each other, wherein the first inner wall comprises a first tooth extending into the cut-out portion; and
    a third inner wall and a fourth inner wall provided opposite to each other, wherein the third inner wall and the fourth inner wall comprise a second tooth extending into the cut-out portion, wherein the first inner wall, the second inner wall, the third inner wall, and the fourth inner wall define the cut-out portion.

6. The positioning system of claim 1, wherein the pusher component comprises:
    a first inner wall comprising a first tooth extending into the cut-out portion;
    a second inner wall provided opposite the first inner wall, wherein a length of the second inner wall is less than a length of the first inner wall;
    a third inner wall substantially orthogonal to the first inner wall and the second inner wall, wherein the third inner wall comprises a second tooth extending into the cut-out portion; and
    a fourth inner wall provided opposite to the third inner wall, substantially orthogonal to the first inner wall or the third inner wall comprises a hook extending into the cut-out portion, wherein the hook is to interface with a slot of the cassette.

7. The positioning system of claim 1, wherein the cassette comprises a first tooth and a second tooth configured to interface with the pusher component.

8. The positioning system of claim 1, wherein one or more additional sample slides are provided, and wherein the additional sample slides are located in one of: the cassette, or one or more additional cassettes.

9. The positioning system of claim 1, wherein the cassette comprises a slot provided at a first end to interface with a hook extending from an inner wall of the pusher component.

10. The positioning system of claim 1, wherein a top surface of the cassette is parallel to a top surface of the stage.

11. The positioning system of claim 1, wherein a groove is formed at a top surface of the cassette, and wherein the groove is configured to form-fit a sample slide.

12. The positioning system of claim 1, wherein the cassette comprises a recess provided on a top surface of the cassette.

13. The positioning system of claim 5, wherein upon the horizontal movement of the cassette, the cassette abuts against the first tooth and the second tooth extending from the first inner wall and the third inner wall of the pusher component.

14. The positioning system of claim 1, wherein the processing unit is further configured to:
- capture an image corresponding to a positioned section of the sample slide; and
- stitch the image with one or more additional images corresponding to positioned sections of the sample slide to obtain a panoramic image of the sample.

15. The positioning system of claim 1, wherein the cassette is situated within the cut-out portion of the pusher component in a semi-firm fit.

* * * * *